April 22, 1924.

F. W. LOW

VEHICLE INDICATOR

Filed Sept. 26, 1921   2 Sheets-Sheet 1

1,491,712

Inventor.
F. W. Low.
By Victor J. Evans
attorney

April 22, 1924.
F. W. LOW
VEHICLE INDICATOR
Filed Sept. 26, 1921   2 Sheets-Sheet 2
1,491,712
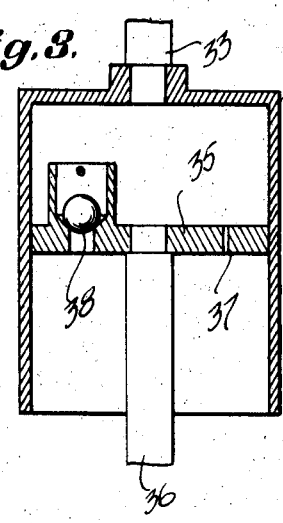
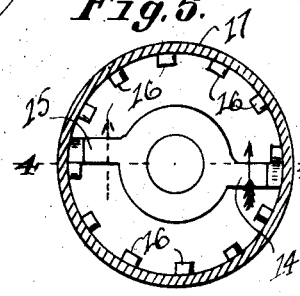
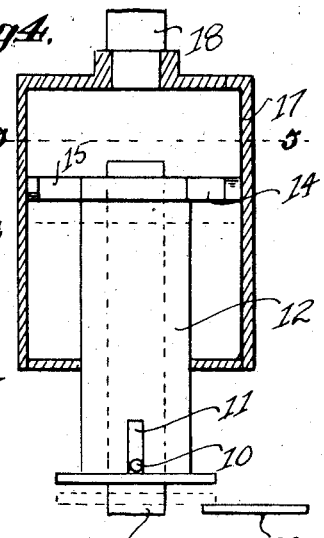
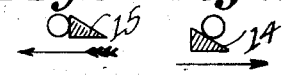
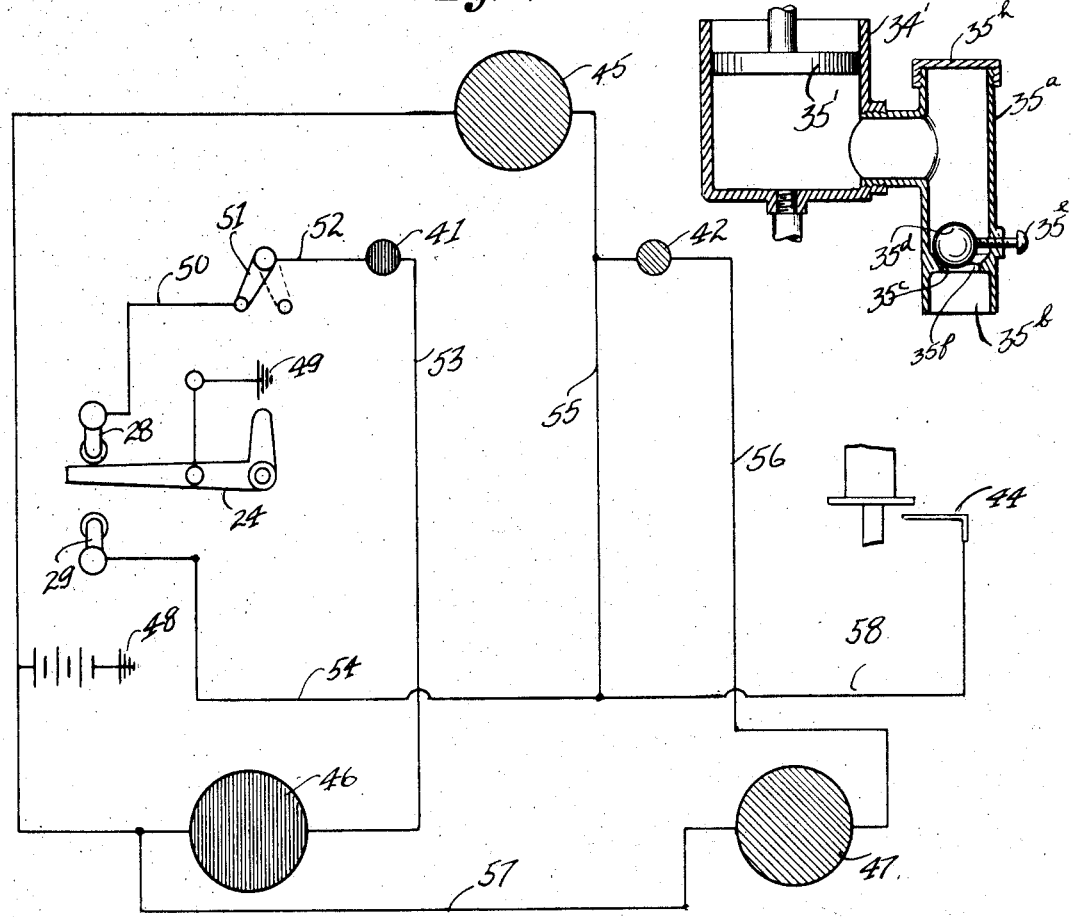
Inventor.
F. W. Low
By Victor J. Evans
Attorney Patented Apr. 22, 1924.

1,491,712

UNITED STATES PATENT OFFICE.

FRED W. LOW, OF VALLEJO, CALIFORNIA.

VEHICLE INDICATOR.

Application filed September 26, 1921. Serial No. 503,189.

*To all whom it may concern:*

Be it known that I, FRED W. LOW, a citizen of the United States, residing at Vallejo, in the county of Solano and State of California, have invented new and useful Improvements in Vehicle Indicators, of which the following is a specification.

This invention relates to improvements in vehicle indicators, and more particularly to indicators which are used upon motor vehicles.

The principal object of this invention is to produce an indicator which will be automatic in its operation.

Another object is to produce an indicator which will indicate to a following or approaching vehicle the movements of the car having my indicator applied thereto.

Another object of this invention is to provide an indicator of the character described, whereby the driver of the car will be advised, without the necessity of moving from the driver's seat, as to whether or not the tail light of the machine is burning.

A further object is to produce a device of this character which is simple in construction, economical to manufacture, positive in operation, and highly serviceable.

Other objects and advantages will be apparent during the course of the following description.

Figure 1:
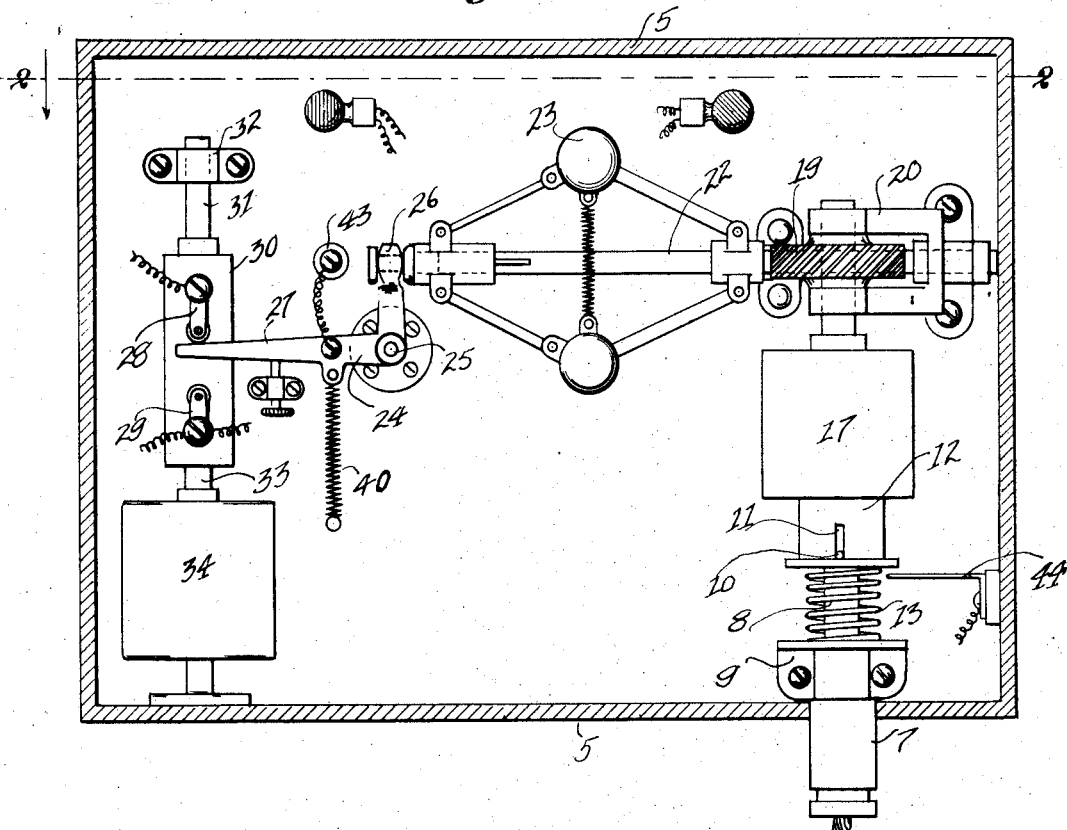
Figure 2:
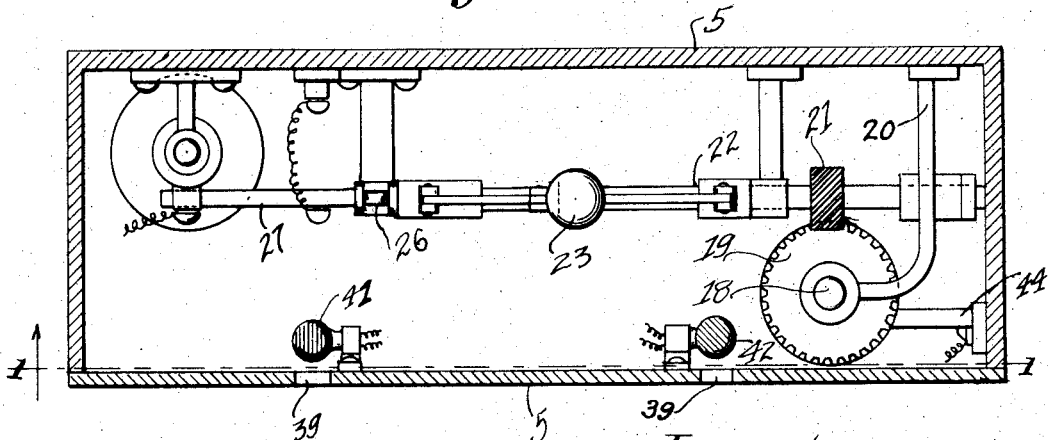

In the accompanying drawings forming a part of this specification and in which like numerals are employed to designate like parts throughout the same, Fig. 1 is a vertical cross-section of my device taken on the line 1—1 of Figure 2, Fig. 2 is a horizontal cross-section taken on the line 2—2 of Figure 1, Fig. 3 is a vertical cross-section of a dash-pot as employed in my device, Fig. 4 is a vertical cross-section of a clutch, Fig. 5 is a cross-section taken on the line 5—5 of Figure 4, Figs. 6 and 7 are detail views of a clutch-engaging mechanism, Fig. 8 is a diagramatic view of the wiring of my device, and Fig. 9 is a vertical section showing a modified type of dash-pot that may be employed.

It is well known that there are times when it is impossible to give a visible signal when about to slow down, and it is to provide this means that I have perfected my device, and in order to have the same automatic. I propose to use a governor for indicating the maneuvers, which governor will be responsive to the various fluctuations in speed of the device upon which the same is being used.

In the drawings wherein for the purpose of illustration is shown a preferred embodiment of my invention, the numeral 5 designates a box, which is preferably attached to the dash-board of a car, together with other conventional indicators.

The numeral 6 designates a flexible shafting, which is adapted to be secured to any rotating part of the car so that the same will rotate when the car is in movement. This flexible shafting extends through a suitable bushing 7 and is provided with a shaft 8 upon its end. This shaft is mounted in a bearing 9 and is provided with a pin 10 at its extremity, which pin is adapted to engage a slot 11 in a movable clutch member 12. This movable clutch member is maintained in its normal position by a spring 13 extending between it and the bearing 9.

By referring to Figures 4 and 5, the construction of this clutch member will be better seen wherein arms 14 and 15 are provided upon the sliding clutch member, which arms are beveled, as shown in Figures 6 and 7. These arms are adapted to engage pins 16 suitably spaced around the interior of a hollow clutch member 17. This clutch member is provided at its upper end with a shaft 18, which carries a worm-gear 19. A suitable support 20 is likewise provided, which straddles the gear 19 and maintains the same in alignment with a worm 21 suitably secured to a shaft 22 carrying a governor thereon, which is indicated, as a whole, by the numeral 23. The operation of a governor is well known and needs no further description.

At 24 I have shown a bell crank lever, pivoted as at 25 and having one end 26 engaged by the governor 23, and having its other arm 27 extending horizontally so as to lie between contacts 28 and 29, mounted upon a movable block 30 supported at its upper end by a shaft 31 in turn adapted to slide in a suitable support 32. The lower end of this block is connected by a shaft 33 to the movable portion 34 of a dash-pot, the construction of which is best shown in Figure 3, wherein the member 34 is seen to be hollow, and is adapted to receive a piston 35 secured to a support 36 which is in turn mounted upon the bottom of the box 5.

A bleeder 37 is provided in the piston 35 as well as a ball valve 38. Suitable openings 39 are provided in the face of the box 5 so that colored lamps as shown at 41 and 42 may be viewed from without. The numeral 43 indicates a ground and the numeral 44 an insulated electrical contact secured upon the side of the box 5 and in line with the movable clutch member 12.

By referring to Figure 8, the numeral 45 indicates a green light placed upon the front of the car and the numerals 46 and 47 a red and green light respectively placed upon the rear of a machine.

In Figure 9 I have shown a combination dash-pot and bleeder which may be employed instead of the dash-pot set forth in Figure 3. In this modified form the numeral 34' represents a stationary dash-pot, while the numeral 35' designates a movable piston. Detachably secured to the dash-pot is a casing 35$^a$ forming an intake 35$^b$. Positioned adjacent the intake is a valve seat 35$^c$ in which rests a ball 35$^d$. For the purpose of actuating the ball a set screw 35$^e$ is adjustably secured in the wall of the casing. The symbol 35$^f$ designates a clearance for the intake which corresponds to the bleeder 37 shown in Figure 3. In order that access may be had to the casing for the purpose of inspecting the same, a cap 35$^h$ is detachably secured to the upper extremity of the said casing.

The operation of my device is, as follows:

When a machine starts, motion is transmitted through the flexible shaft 6 and the clutch to the worm gear 19. This motion in turn is transmitted through worm 21 to the governor 23. This movement acts upon the bell crank lever 24 against the tension of the spring 40. As the dash-pot 34 is provided with a valve, the same is easily lifted by the upward movement of the lever 24 and retained in that position until the speed of the car is checked.

While in this position, the current from a battery such as is diagrammatically indicated in Figure 8, will pass from the ground 48 to the ground 49, thence through the bell crank 24, contact 28, wire 50, switch 51, wire 52, through red light 41, wire 53, red-light 46 and back to the battery. As soon as the speed of the car is checked, the governor will act and cause the bell-crank lever 24 to move downwardly. It will then contact with the contact 29, and will maintain this contact until the dash-pot 34 has operated, which will be slow on account of the size of the bleeder 37.

During the time that the lever 24 is in contact with the contact 29, the green lights 45 and 47 will be illuminated by current passing from the ground 48 to the ground 49, lever 24, contact 29, wire 54, wire 55, green-light 45, and thence back to the battery. At the same time, a portion of the current will be shunted through the green-light 42, wire 56, green-light 47, wire 57, and thence to the battery.

As soon as the air in the dash-pot has escaped, the contact 28 will again engage the lever 24 and only the red-lights will be illuminated. This condition will maintain until the speed is again decreased and it is to be noted that increase of the speed will not affect the red-lights in any way. Should the vehicle be standing and start to back, the reverse movement of the shaft 6 will force the movable part 12 of the clutch downwardly against the tension of the spring 13 through the engagement of the inclined portions of the arms 14 and 15 with the pins 16, which will cause the movable clutch member 12 to intermittently contact with the contact 44. This contacting will result in current flowing from the ground 48 through the ground 49, lever 24, governor assembly, gearing, etc., to the contact 44, thence through wire 58 to wire 55, from which point the current will flow to the battery as before described for the green lights.

It is well to mention that during the functioning of the parts as just described, that the operation of the lights is as follows:

When the machine maintains a steady or increasing speed, only the red lights will be illuminated. This condition will be maintained until the speed is again decreased. Should the vehicle be slowed down until stopped the green lights will show during the maneuver, but will be extinguished and then be replaced by the red light when the machine comes to a standstill.

Thus, it will be seen that I have provided a signal, which will maintain a red-light while the car is standing or moving forward, and will instantly indicate when the car's speed slackens, and will flash an intermittent green light during a reverse movement. It is to be noted that this operation will all transpire without the necessity of the operator distracting his attention from driving the machine.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. In an automobile signal, the combination of a receptacle, adapted to be mounted upon a vehicle, signal lights adapted to be mounted upon the vehicle, a centrifugal governor mounted within said receptacle, means for rotating said governor when said vehicle is in motion, a clutch mounted between said governor and said motion-transmitting means, a bell crank lever operated by said governor, a block suitably mounted adjacent said bell crank lever, space contacts mounted on said block and adapted to be contacted separately by said lever, a dash-pot for controlling the movement of said block, said dash-pot allowing free movement in one direction and retarded movement in the opposite direction, and a contact mounted adjacent said clutch, and adapted to be intermittently engaged by said clutch when said vehicle is moved in a reverse direction.

2. In an automobile signal, the combination of a receptacle adapted to be mounted upon a vehicle, a centrifugal governor mounted within said receptacle, means for rotating said governor when said vehicle is in motion, a clutch mounted between said governor and said motion transmitting means, said clutch comprising a hollow member having inwardly projecting pins mounted therein, a vertically movable clutch member adapted to be slidably secured within said hollow clutch member, said vertically movable clutch member being provided with arms, said arms having beveled top surfaces and a vertical base, a bell crank lever adapted to be moved by said governor, a movable block mounted adjacent the end of said bell crank lever, spaced contacts mounted on said block and adapted to be contacted separately by said lever, a dash-pot for controlling the movement of said block, said dash-pot allowing free movement in one direction and retarted movement in the opposite direction, and a contact mounted adjacent said vertically movable clutch member, and adapted to be intermittently engaged by said vertically movable clutch member when said vehicle is moved in a reversed direction.

In testimony whereof I affix my signature.

FRED W. LOW.